J. BECKER.
COKING RETORT OVEN.
APPLICATION FILED FEB. 7, 1917.
1,312,301.
Patented Aug. 5, 1919.
9 SHEETS—SHEET 1.
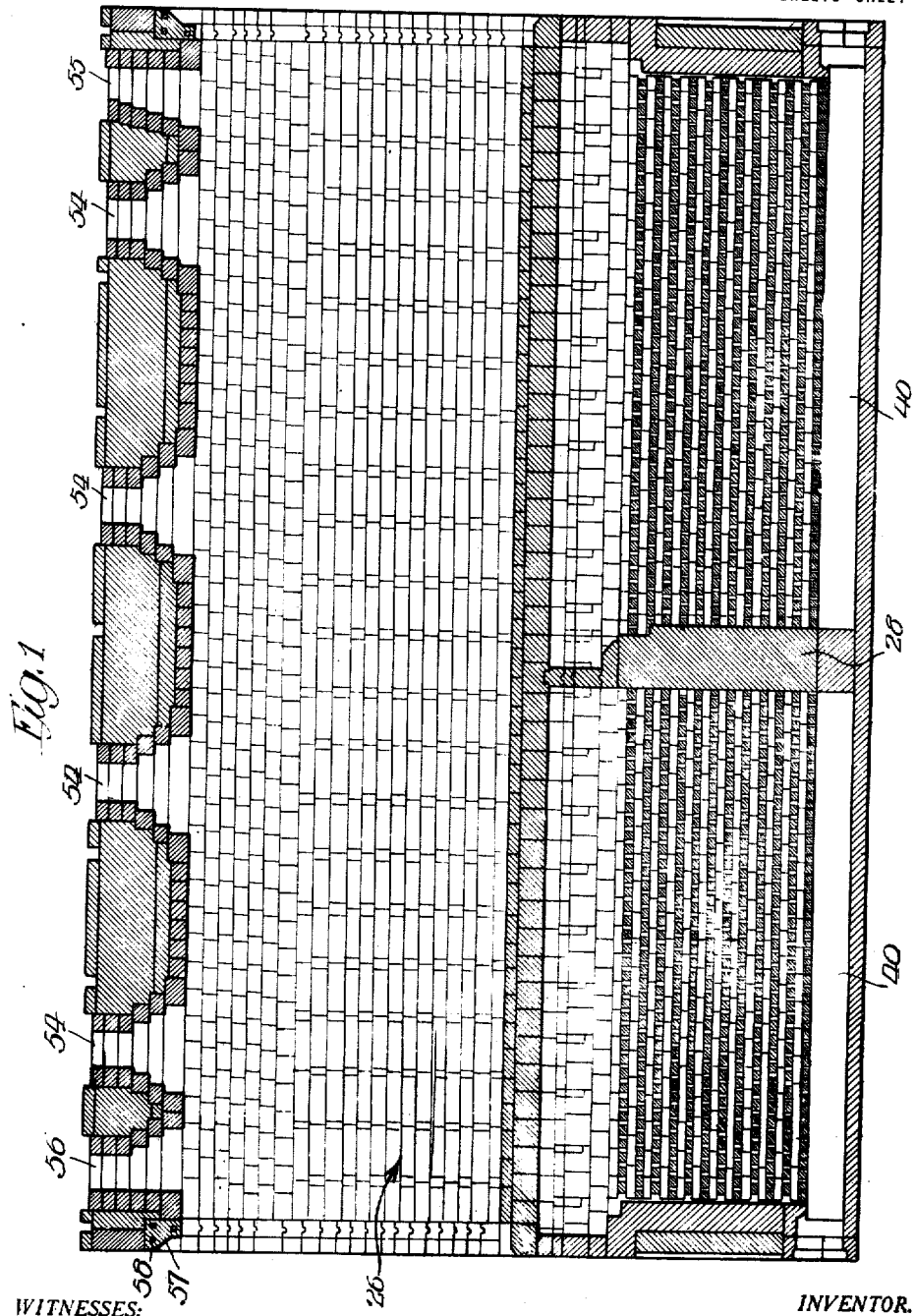
WITNESSES:
INVENTOR.
Joseph Becker
BY
ATTORNEYS.

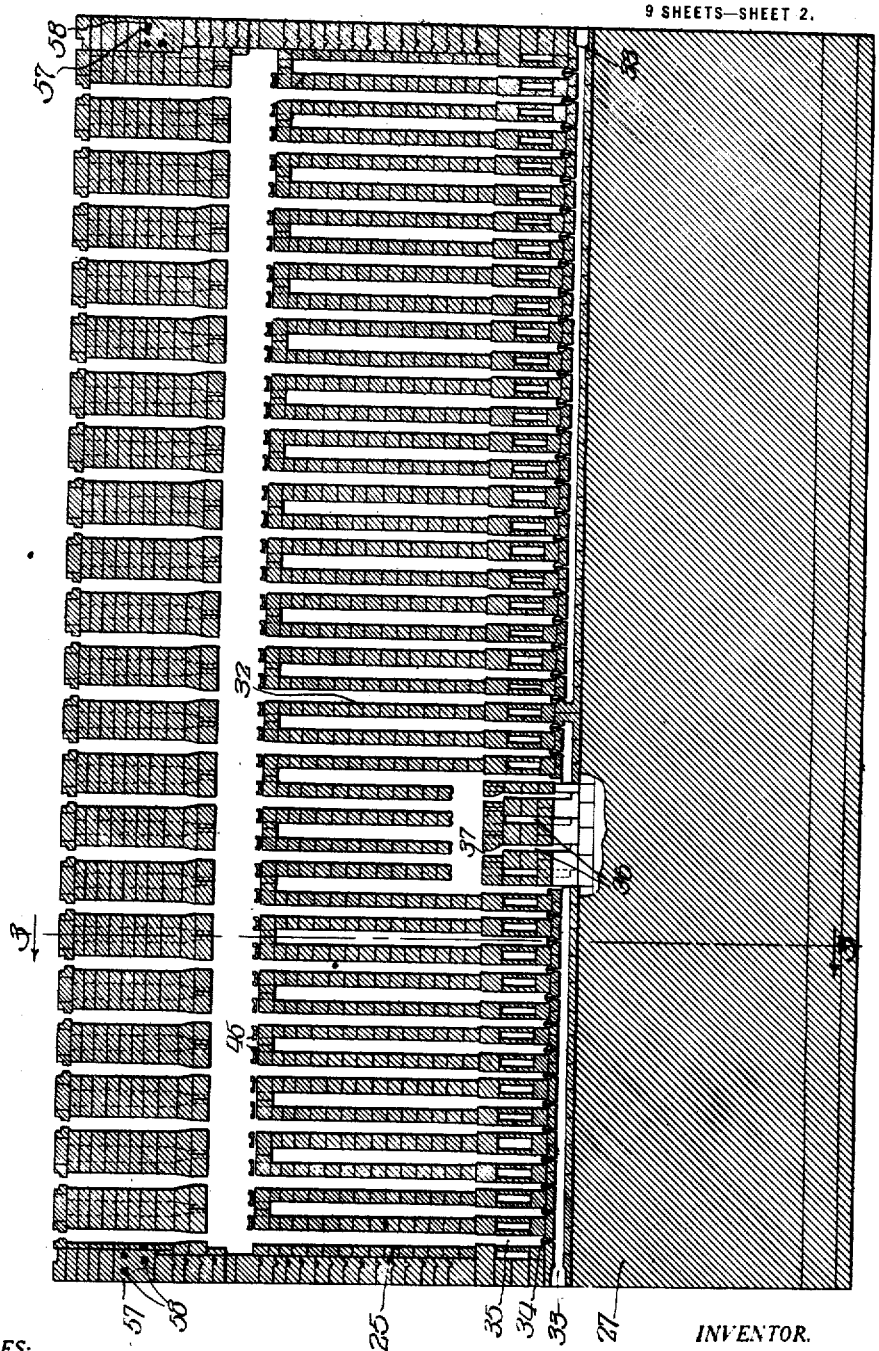

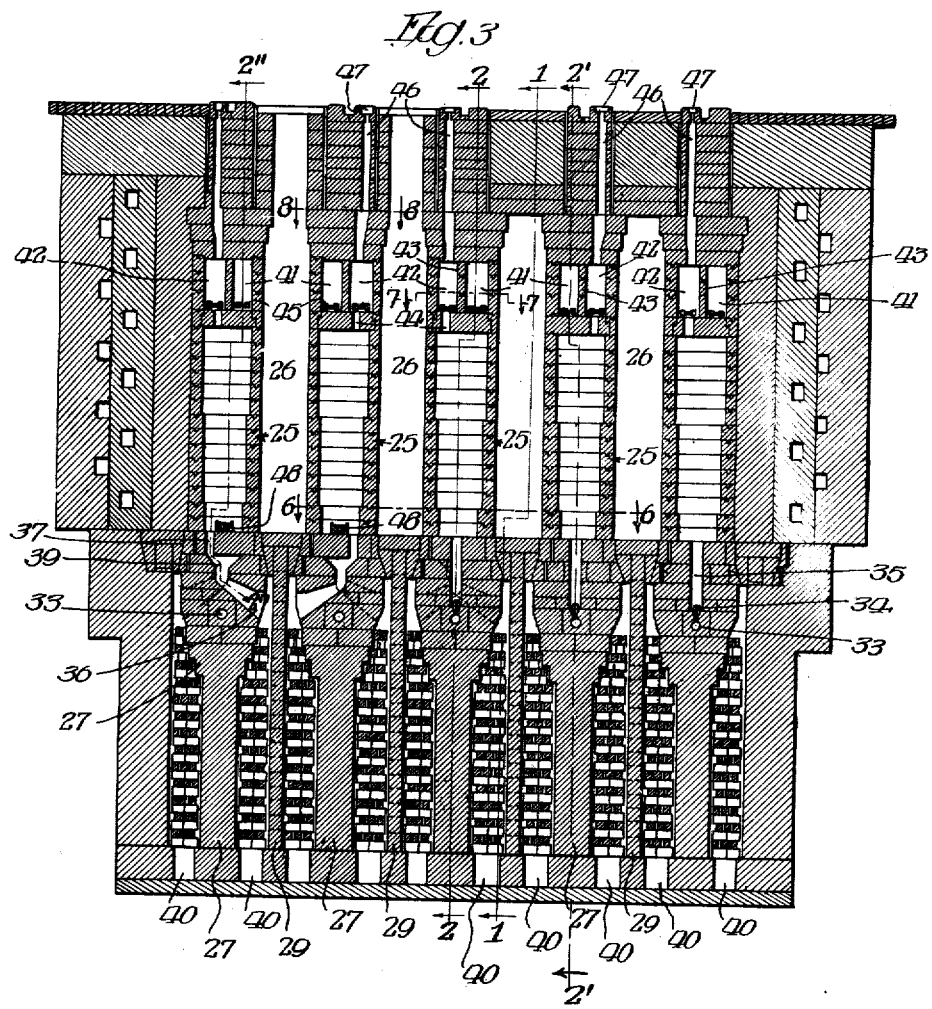

J. BECKER.
COKING RETORT OVEN.
APPLICATION FILED FEB. 7, 1917.
1,312,301. Patented Aug. 5, 1919.
9 SHEETS—SHEET 4.
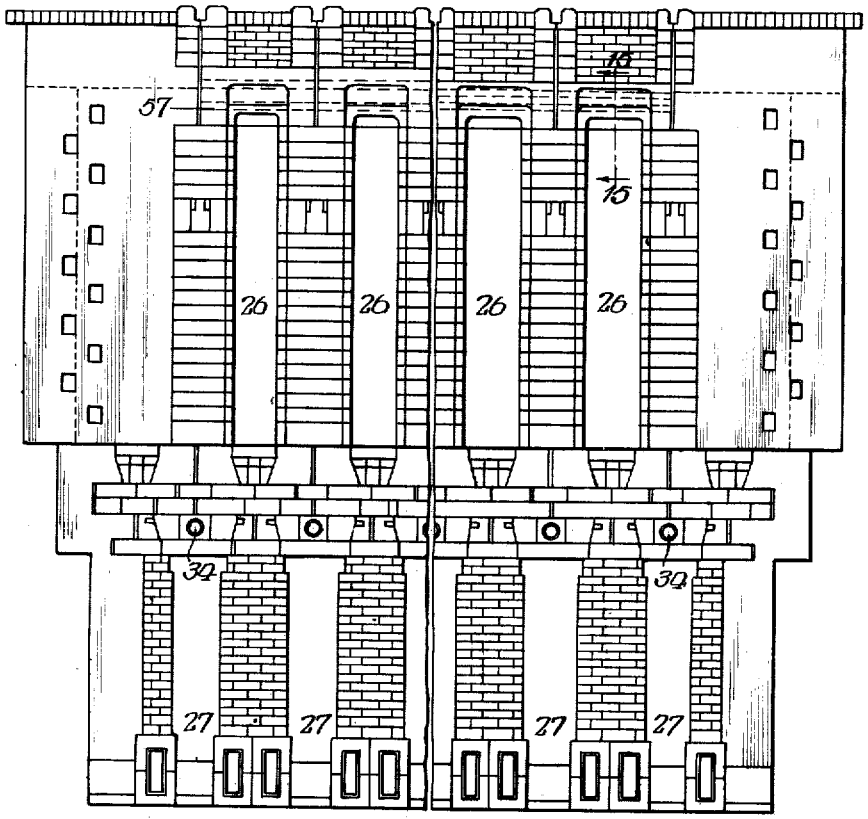
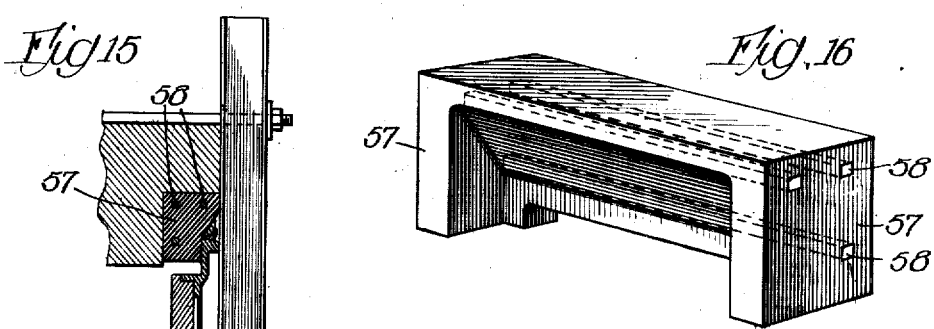
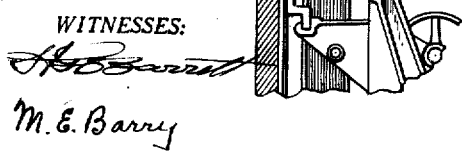
WITNESSES:
INVENTOR.
Joseph Becker
BY
ATTORNEYS.

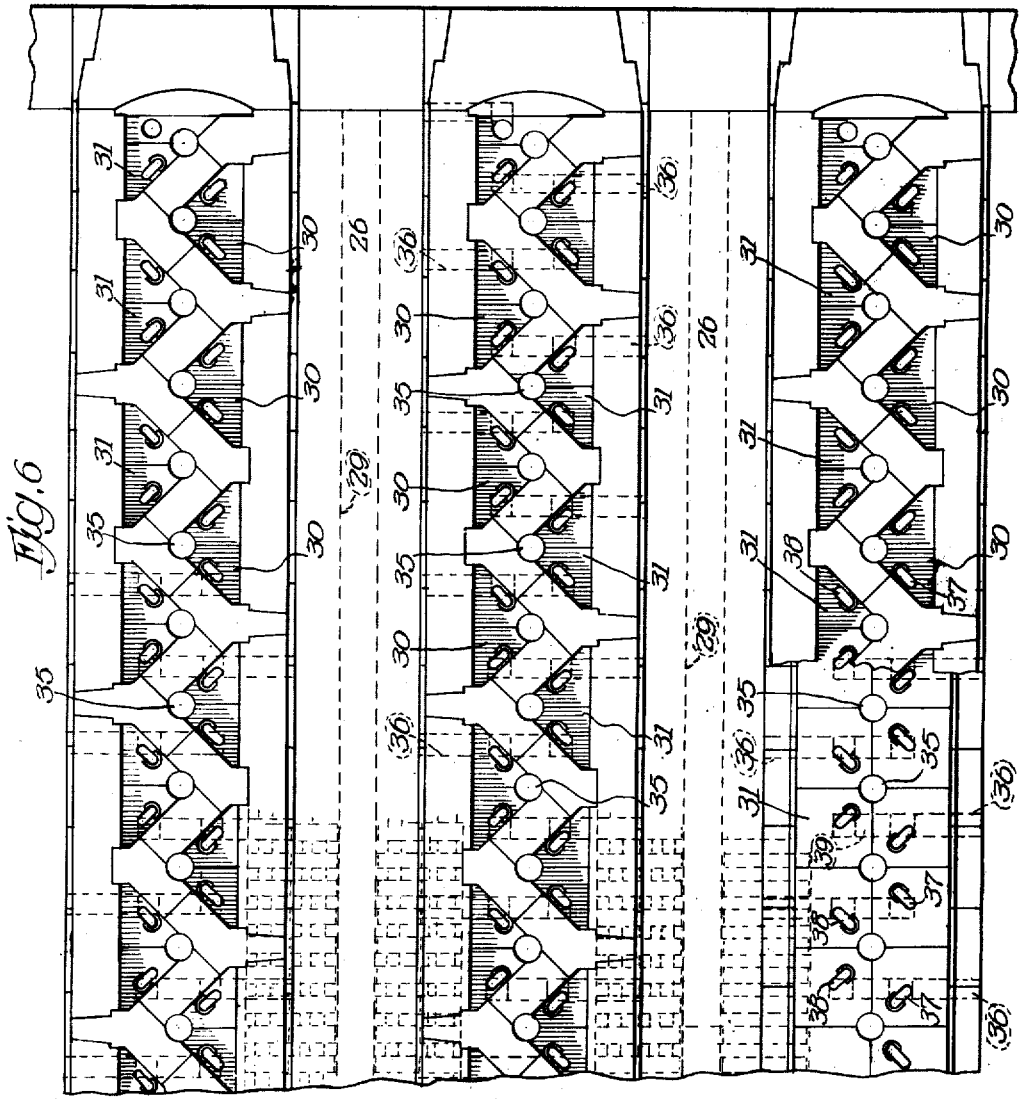

J. BECKER.
COKING RETORT OVEN.
APPLICATION FILED FEB. 7, 1917.
1,312,301.
Patented Aug. 5, 1919.
9 SHEETS—SHEET 6.
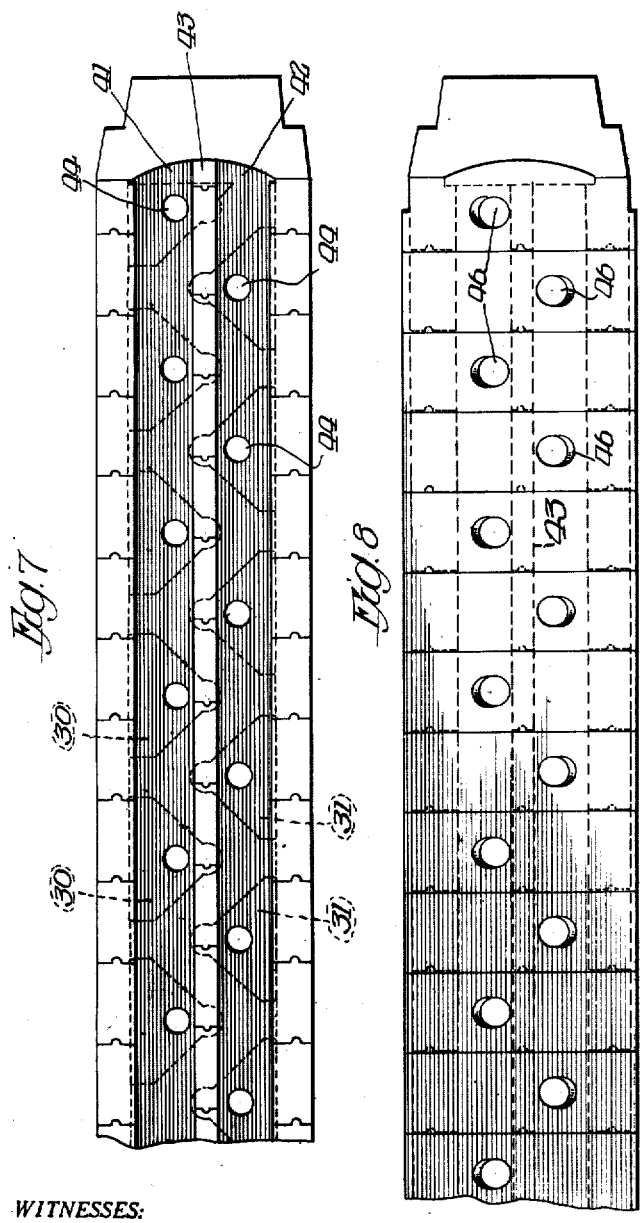
WITNESSES:
INVENTOR.
Joseph Becker
BY
ATTORNEYS.

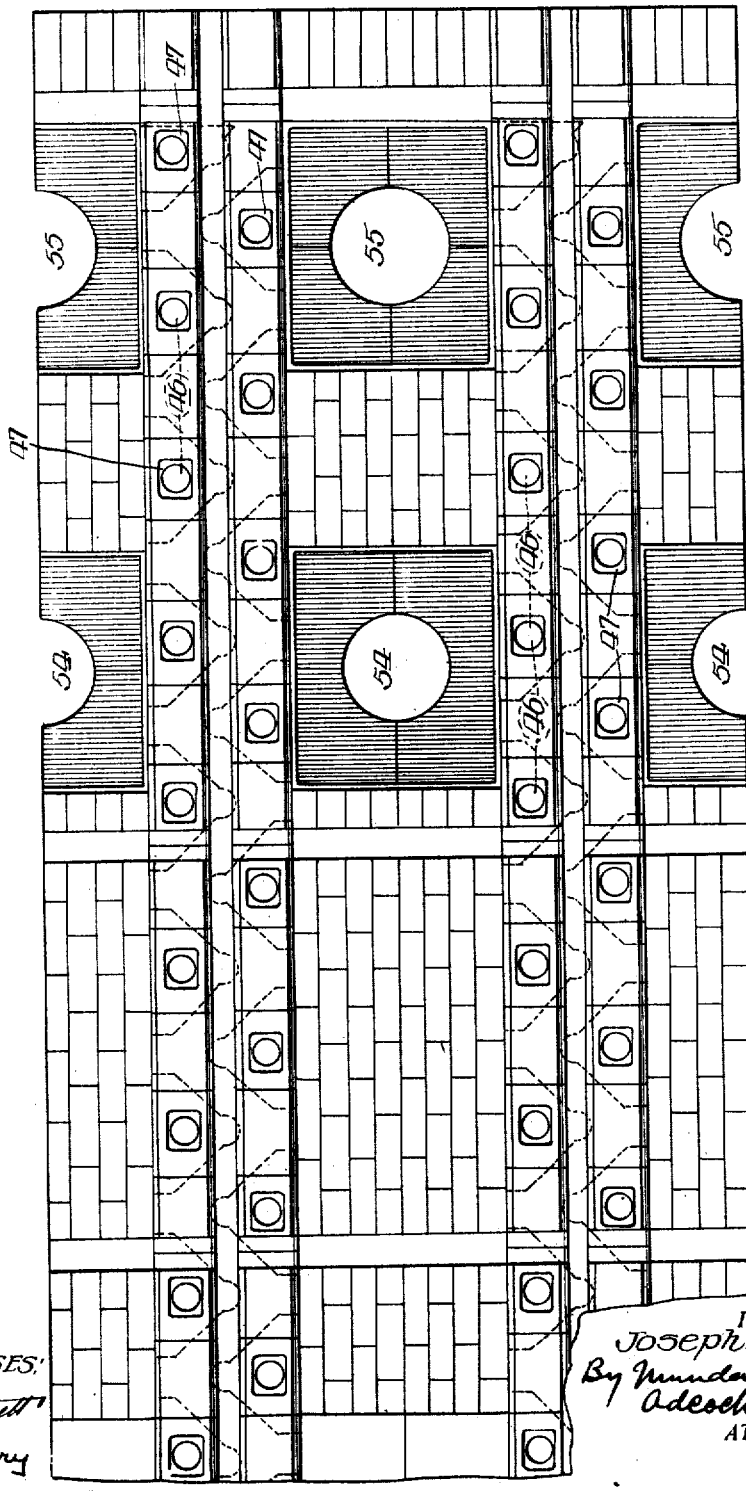

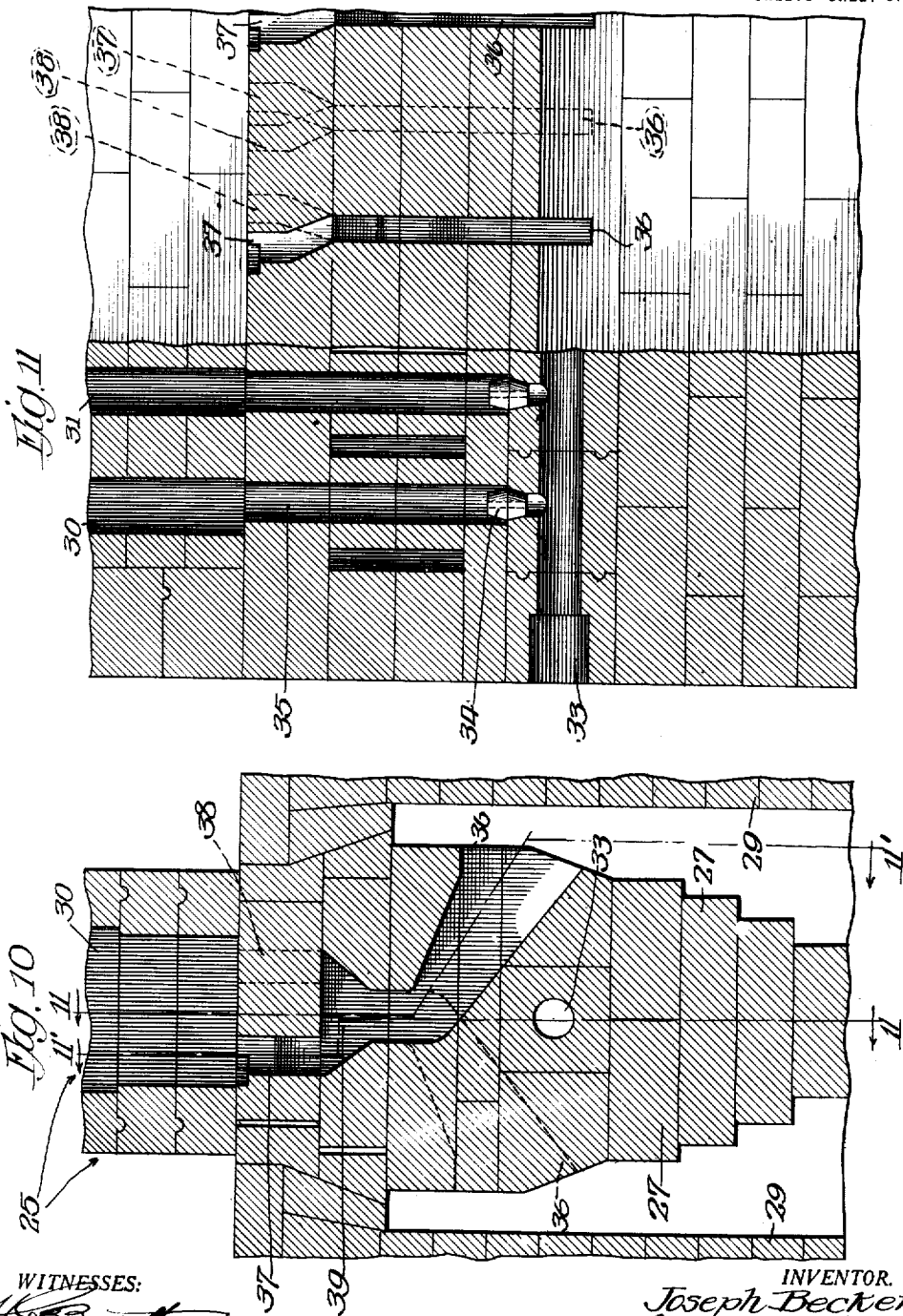

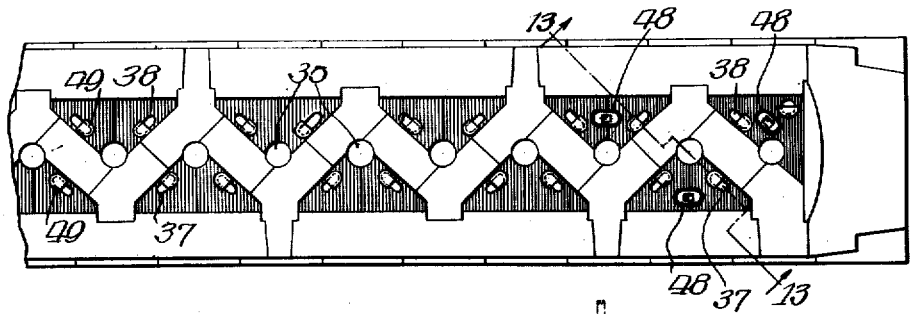
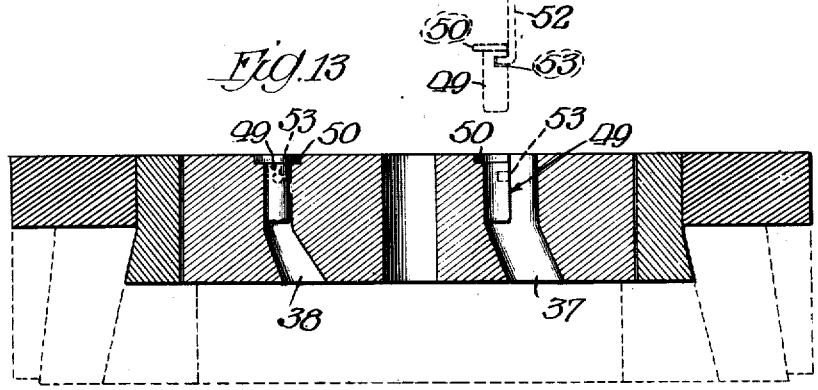
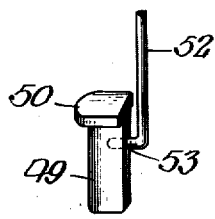
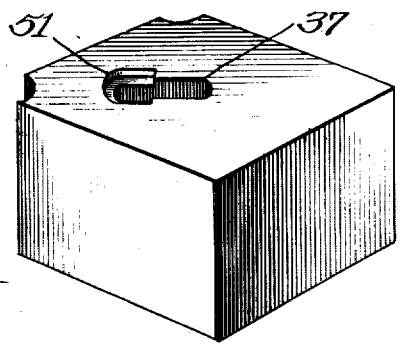

UNITED STATES PATENT OFFICE.

JOSEPH BECKER, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

COKING RETORT-OVEN.

1,312,301.  Specification of Letters Patent.  Patented Aug. 5, 1919.

Application filed February 7, 1917. Serial No. 147,134.

*To all whom it may concern:*

Be it known that I, JOSEPH BECKER, a citizen of the United States, residing in Pittsburgh, in the county of Allegheny and State of Pennsylvania, have invented a new and useful Improvement in Coking Retort-Ovens, of which the following is a specification.

This invention relates to coking retort ovens, and more particularly to those of the well-known Koppers cross-regenerator type, exemplified in the Koppers coke-oven Patents 818033, 1026169 and others, and also more particularly relates to coking retort ovens, whether of such cross-regenerator type or otherwise, having the flue-construction set forth or claimed in the Schwab coke-oven Patent 989302, and also more particularly relates to such other coking retort oven constructions as are hereinafter set forth or claimed. And the invention includes among its objects an increasing of the coking efficiency of such ovens, an increasing of their flexibility of operation, a reducing of their cost of maintenance, an increasing of their permanence and durability and resistance to the strains and variations of the high temperature conditions to which they are subjected, and such other improvements or advantages in construction and operation as are found to obtain in the structures and devices hereinafter described or claimed.

In the accompanying drawings, forming a part of this specification, and showing, for purposes of exemplification, a preferred form and manner in which the invention may be embodied and practised, but without limiting the claimed invention specifically to such illustrative instance or instances:—Figure 1 is a vertical section longitudinally through a coking-chamber and the regenerators below it, on the line 1—1 of Fig. 3; Fig. 2 is a vertical section longitudinally through a heating-wall, on the lines 2—2 and 2'—2' and 2''—2'' of Fig. 3, the left-hand end of said Fig. 2 being taken on the line 2—2 and the right-hand end on the line 2'—2' and the short intermediate section on the line 2''—2''; Fig. 3 is a vertical transverse section through a battery of four ovens, taken on the line 3—3 of Fig. 2, without indicating the diagonal partitioning in the heating-walls; Fig. 4 is a front elevation of two of the ovens, taken on the pusher side; Fig. 5 is a front elevation of the same two ovens, taken on the coke side; Fig. 6 is an enlarged horizontal section and plan view through three of the heating-walls, taken on the line 6—6 of Fig. 3, showing the triangular flues in section and the bottoms and air and gas ports of said flues in plan; Fig. 7 is an enlarged horizontal sectional and plan view through the combustion-products ducts above one of the heating-walls, taken on the line 7—7 of Fig. 3 and showing in plan the top ports of the triangular flues, which are indicated in dotted lines; Fig. 8 is an enlarged horizontal sectional and plan view at a higher level over the same heating-wall, taken on the line 8—8 of Fig. 3 and showing the passages that provide access to the flues and to the slide-bricks adjustable over their top ports, which open into the pair of horizontal combustion-products ducts that are indicated in dotted lines; Fig. 9 is a top plan view taken over a couple of the heating-walls and extending from the pusher end of the ovens, showing in full plan the by-product port and one of the charge holes of the coking-chamber between the two heating-walls whose triangular flues are indicated in dotted lines; Fig. 10 is an enlarged vertical transverse section through the base of one of the heating-walls and the top of the heavy supporting-wall beneath such heating-wall, to show the general arrangement of the ducts joining the flues of the heating-wall with the regenerators on the respective sides of the said supporting-wall, but without indicating the diagonal partitioning in the heating-wall; Fig. 11 is a vertical longitudinal sectional view taken on the lines 11—11 and 11'—11' of Fig. 10, the left-hand part of said Fig. 11 being on the line 11—11 and showing more particularly the coke-oven-gas inlet into the flues, and the right-hand part being on the line 11'—11' and showing more particularly the general arrangement of the ducts joining the flues with the regenerators; Fig. 12 is a horizontal sectional and plan view of one of the heating-walls just as shown in Fig. 6 but with the plugging devices inserted in the two regenerator-duct ports in the bottom of each flue, and also showing the movable closure-brick that may be employed to close either of said two ports in each flue; Fig.

13 is an enlarged vertical sectional view on the line 13—13 of Fig. 12 and showing the positioning of the plugging devices in the regenerator-duct ports where the same open into a pair of the flues, and also showing the upper portion of the vertical channel that leads up from the nozzle for supplying coke-oven-gas to one of said flues; Fig. 14 is an enlarged perspective view showing one of the plugging devices as it is lowered into or lifted from the regenerator-duct port in the brick in which such port is formed; Fig. 15 is an enlarged vertical sectional view on the line 15—15 of Fig. 5 and also indicating the upper part of the coking-chamber door and a portion of an arm of the door-lifting machine; and Fig. 16 is an enlarged perspective view of the reinforced arch-brick shown in section over the doorway in Fig. 15. Like reference numerals indicate like parts in all of the figures.

The series of heating-walls 25, 25 and the series of intermediate elongated coking-chambers 26, 26 in the battery are mainly supported by the heavy supporting-walls 27, 27 located under the heating-walls. The regenerators are located between the heavy supporting-walls and alined under the soles of the respective coking-chambers, and are of the "cross-regenerator" type, the type characterized by the fact that the regenerator extends crosswise of the battery so that the main flow into and out of the base of each main regenerator-chamber is substantially parallel with the length of the heating-wall or walls communicating with such regenerator-chamber.

There are a pair of regenerators under the sole of each coking-chamber, the members of the pair being separated by the gas-tight partition wall 28 transversely positioned under the middle of the sole of the coking-chamber. Each of said regenerators is longitudinally subdivided by a relatively thin partition 29, which itself supplements the regenerative surface provided by the checker-bricks in the rest of the regenerator-chamber.

Each heating-wall is constituted of two series, 30 and 31, of substantially triangular combustion-flues alternately facing oppositely toward the coking-chambers contiguous to either side of each such heating-wall. Each of such flues, by reason of its triangular form, is relatively narrow transversely of the wall and presents a wide heating-face toward the contiguous coking-chamber. The said two series of flues in each heating-wall are operatively disposed in two groups, each of about half the length of the heating-wall and respectively on opposite sides of the center-wall 32 (indicated at the middle of the heating-wall shown in longitudinal section in Fig. 2).

The two series of triangular flues in each half of the length of each heating-wall are arranged to be supplied with coke-oven-gas from a single straight gas-duct 33, which extends under half of the length of the heating-wall and is provided with a series of nozzles 34 respectively opening into vertical channels 35 leading upward respectively into the inside angles of the flues of both series in the group constituting the corresponding half of the heating-wall.

Each regenerator portion communicates with each flue of both series of flues in each of the two heating-walls adjacent opposite sides of the top of such regenerator, extending substantially half of the length of the coking-chamber above said regenerator. Such communication between the flues and the regenerators is by means of forked regenerator-ducts 36, each extending first obliquely and then vertically upward into the top of the heavy wall 27, and then forking into two ascending ports 37, 38 that respectively open into a pair of oppositely facing contiguous flues, one in each of the two flue-series in the heating-wall. These two branches of such forked duct become substantially vertical under the flue into which each becomes a port, and are so offset from the main channel of the duct (at its place of forking, 39) as to equalize the regenerator flow from such channel into and through such branches of the fork.

When the ovens are operated as "coke-ovens," all of the regenerators used are employed as air-regenerators, and the fuel-gas employed is coke-oven gas supplied through the gas-ducts 33. When the ovens are operated as coking "gas-ovens," the coke-oven gas supply is shut off from the gas-ducts 33, and only alternate regenerators are employed as air-regenerators, and the other regenerators of the battery are employed as gas-regenerators for preheating producer-gas. Each longitudinal half of each regenerator has beneath it a channel 40 through which air or gas to be preheated is admitted and distributed, and through which, upon reversal, the waste-gas passes to the stack main. The reversing and shut-off means for all of the air and gas connections with the channels 40 and gas-ducts 33 are of the well-known form shown in, for instance, the Koppers Patent 1176067.

Above the flues in each heating-wall there are a pair of combustion-products ducts 41, 42, separated by a longitudinal vertical wall 43 and each communicating with one of the series of flues, through their top-ports 44, whose orifices opening into such ducts are regulated by the adjustable slide-bricks 45, operated from above through the vertical passages 46 that extend to the top of the battery and are closed by the cap-plates 47.

When the battery is in full operation, the entire group of both series of flues for substantially half the length of each heating-wall is fired simultaneously, and the combustion-products flow horizontally through the ducts 41, 42 and down into and through the flues of the group constituting the other half of the length of the heating-wall, and thence through the regenerators of the corresponding other half or side of the battery.

Any regenerator, or either longitudinal half of any regenerator, may be shut off from its communication with either or both of the series of flues in a heating-wall, by shutting off the corresponding regenerator port, with the shiftable closure-brick 48 that rests upon the bottom of each flue and is operable by means of a rod thrust down through the corresponding vertical passage 46 and flue top-port 44. Through this means, together with the usual means for shutting off the channels 40 under the regenerators, the employment of any regenerator, or of either longitudinal half of any regenerator, on either side of its longitudinal partition 29, may be dispensed with, and any coking-chamber may be individually heated, and heated by the firing of either both or only one of the two series of flues in the heating-wall on each or either side of such coking-chamber.

When the ovens are being operated as "gas-ovens," employing the series of regenerators as alternate air-regenerators and gas-regenerators, the regenerator-duct ports 37, 38 are normally left fully open into the combustion-flues of the heating-walls that are being thus fired with preheated producer-gas. But when the ovens are operated as "coke-ovens," firing with the coke-oven gas supply and employing the regenerators only as air-regenerators, it becomes necessary to reduce the air flow that would then enter the combustion-flues if the regenerator-duct ports were left fully open into the flues. It is also desirable under various conditions to increase the velocity of the air-streams that are projected into the combustion-flues, and also to maintain such streams in substantial parallelism with the inflowing jet of coke-oven gas. To these ends there are provided removable plugs 49 for reducing the orifices of the said regenerator-duct ports 37, 38 or either of them. These plugs are adapted to enter deeply into said ports and form with the opposing walls thereof a straight channel, whereby the cross-section of the issuing air-stream is reduced without deflecting it from its substantial parallelism with the gas-stream that is being projected upward into the flue from the gas channel 35. These plugs 49 are of refractory material, and the top of each plug is provided with a flange 50 that is adapted to socket in a corresponding recess 51 in the top edge of one side of the air-port. The bottom of the plug is so arranged that the air impinging upon it will be deflected against the opposite free vertical wall of the air-port far enough below the top of such port so that the upwardly projected air-stream will not be deflected from a substantially vertical direction. The plugs are inserted in and withdrawn from the air-ports by means of a hand-rod 52 whose bent end is hooked into the socket 53 in the free front face of the plug, such hand-rod being thrust down through the vertical passage 46 into the corresponding flue in whose air-ports the plugs are to be inserted or lifted out. A further closure of any air-port may be effected by shifting the above-mentioned closure-brick 48, either with or without removal of a plug 49.

Each coking-chamber is provided at its top with four charge holes 54 and also has a by-product gas-port 55 at its pusher end, and, near its other end, a smoke outlet 56, employed while charging the oven. All of these openings are of course provided with suitable closures in the usual manner. The end-closures of the coking-chambers are indicated in Fig. 15 as lifting removable doors of a well-known form. The lifting and replacement of these doors, by means of the door-lifting machine, imposes a severe shock and breaking strain upon the lintel brick 57 forming the top of the doorway. This lintel-brick is constructed of refractory material that does not of itself sufficiently resist such shock and breaking strain, and therefore it is reinforced internally with the metal tie-rods 58, which are embedded in the refractory material when the lintel-brick is formed. This is done by inserting the rods in suitable holes in the refractory material after it has been taken out of the kiln, and embedding said rods in place with cement, so that the rods are not exposed to the extreme heat of the kiln and are intact within the completely formed lintel, which, when in place in service, is not heated to the extreme temperature to which its refractory material has been exposed in the kiln. The tie-rods thus embedded longitudinally through the lintel-brick serve to maintain it in place over the doorway even when it has been cracked or broken by the repeated impact of the lifting and replacement of the removable door.

My invention as hereinafter claimed may of course be embodied in various ways and forms other than the embodiment that has been described as an illustrative instance.

Those features of invention exemplified in the foregoing description which relate more particularly to the employment of such retort-oven construction as a gas oven or a combination gas-oven and coke-oven (except as claimed with the air-port plugs), and to the employment of the forked ducts joining the regenerators and the flues, are the invention of another and are made the subject of the application Serial No. 147,123 filed of even date herewith by Josef van Ackeren, also a resident of Pittsburgh, Pennsylvania.

I claim:—

1. In a coking retort oven having separately controlled gas-supplies for each of its groups of flues, and reversing means for alternately operating said separate gas-supplies and correspondingly reversing the communication of the respective regenerators with the air-supply and the stack-gas outflow; in combination: a series of coking-chambers with intermediate heating-walls, said walls being constituted of two series of substantially triangular combustion-flues alternately facing oppositely toward the coking-chambers contiguous to either side of each such wall, and grouped in the respective halves of the length of such wall; a pair of combustion-products ducts respectively communicating with each series of flues in the heating-wall between each pair of coking-chambers; regenerators separately communicating with the flues grouped in the respective halves of the length of each heating-wall; and separate gas-ducts for each of said groups of flues; substantially as specified.

2. In a coking retort oven having separately controlled gas-supplies for each of its groups of flues, and reversing means for alternately operating said separate gas-supplies and correspondingly reversing the communication of the respective regenerators with the air-supply and the stack-gas outflow, in combination: a series of coking-chambers with intermediate heating-walls, said walls being constituted of two series of substantially triangular combustion-flues, those of one series alternating with those of the other, and the two series respectively facing oppositely toward the coking-chambers contiguous to either side of each such wall, and grouped in the respective halves of the length of such wall; conduit means for conducting the combustion products from one to the other of the groups of flues occupying the respective halves of the length of each heating-wall; regenerators separately communicating with said groups of flues; and separate gas-ducts for each of said groups of flues; substantially as specified.

3. In a coking retort oven having separately controlled gas-supplies for each of its groups of flues, and reversing means for alternately operating said separate gas-supplies and correspondingly reversing the communication of the respective regenerators with the air-supply and the stack-gas outflow, in combination: a series of elongated coking-chambers with intermediate heating-walls, said walls being constituted of two series of substantially triangular combustion-flues alternately facing oppositely toward the coking-chambers contiguous to either side of each such wall, and grouped in the respective halves of the length of such wall; a pair of combustion-products ducts respectively communicating with each series of flues in the heating-wall between each pair of coking-chambers; cross-regenerators below the series of coking-chambers and heating-walls and separately communicating with the flues grouped in the respective halves of the length of each heating-wall; and separate gas-ducts for each of said groups of flues; substantially as specified.

4. In a coking retort oven having separately controlled gas-supplies for each of its groups of flues, and reversing means for alternately operating said separate gas-supplies and correspondingly reversing the communication of the respective regenerators with the air-supply and the stack-gas outflow, in combination: a series of elongated coking-chambers with intermediate heating-walls, said walls being constituted of two series of substantially triangular combustion-flues, those of one series alternating with those of the other, and the two series respectively facing oppositely toward the coking-chambers contiguous to either side of each such wall, and grouped in the respective halves of the length of such wall; conduit means for conducting the combustion products from one to the other of the groups of flues occupying the respective halves of the length of each heating-wall; cross-regenerators below the series of coking-chambers and heating-walls and separately communicating with said groups of flues; and separate gas-ducts for each of said groups of flues; substantially as specified.

5. In a coking retort oven having separately controlled gas-supplies for each of its groups of flues, and reversing means for alternately operating said separate gas-supplies and correspondingly reversing the communication of the respective regenerators with the air-supply and the stack-gas outflow, in combination: a series of elongated coking-chambers with intermediate heating-walls, said walls being constituted of two series of substantially triangular combustion-flues alternately facing oppositely toward the coking-chambers contiguous to either side of each such wall, and grouped in the respective halves of the length of such wall; a pair of combustion-products ducts respectively communicating with each series of flues in the heating-wall between each pair of coking-chambers; cross-regenerators individually alined under the soles of the coking-chambers and separately communicating with the flues grouped in the respective halves of the length of each heating wall; and separate gas-ducts for each of said groups of flues; substantially as specified.

6. In a coking retort oven having separately controlled gas-supplies for each of its groups of flues, and reversing means for alternately operating said separate gas-supplies and correspondingly reversing the communication of the respective regenerators with the air-supply and the stack-gas outflow, in combination: a series of elongated coking-chambers with intermediate heating-walls, said walls being constituted of two series of substantially triangular combustion-flues, those of one series alternating with those of the other, and the two series respectively facing oppositely toward the coking-chambers contiguous to either side of each such wall, and grouped in the respective halves of the length of such wall; conduit means for conducting the combustion products from one to the other of the groups of flues occupying the respective halves of the length of each heating-wall; cross-regenerators individually alined under the soles of the coking-chambers and separately communicating with said groups of flues; and separate gas-ducts for each of said groups of flues; substantially as specified.

7. In a coking retort oven, in combination: a series of coking-chambers with intermediate heating-walls, said walls being constituted of two series of substantially triangular combustion-flues alternately facing oppositely toward the coking-chambers contiguous to either side of each such wall; a pair of combustion-products ducts respectively communicating with each series of flues in the heating-wall between each pair of coking-chambers; air-preheating means supplying preheated air to the flues and heated by the combustion-products from the flues; and gas-supplies for the flues; substantially as specified.

8. In a coking retort oven, in combination: a series of coking-chambers with intermediate heating-walls, said walls being constituted of two series of substantially triangular combustion-flues, those of one series alternating with those of the other, and the two series respectively facing oppositely toward the coking-chambers contiguous to either side of each such wall, and being disposed in continuous rows in respect of the provision for simultaneously firing them; conduit means into which the series of flues directly discharge their combustion-products; air-preheating means supplying preheated air to the flues and heated by the combustion-products from the flues; and gas-supplies arranged to supply gas to continuous rows in both series of such flues fired simultaneously in each heating wall; substantially as specified.

9. In a coking retort oven, in combination: a series of coking-chambers with intermediate heating-walls, said walls being constituted of two series of substantially triangular combustion-flues, those of one series alternating with those of the other, and the two series respectively facing oppositely toward the coking-chambers contiguous to either side of each such wall, and being disposed in continuous rows in respect of the provision for simultaneouly firing them; and gas and air connections arranged to supply gas and air to continuous rows in both series of such flues fired simultaneously in each heating-wall; substantially as specified.

10. In a coking retort oven, in combination: a series of elongated coking-chambers with intermediate heating-walls, said walls being constituted of two series of substantially triangular conbustion-flues, those of one series alternating with those of the other, and the two series respectively facing oppositely toward the coking-chambers contiguous to either side of each such wall, and being disposed in continuous rows in respect of the provision for simultaneously firing them; cross-regenerators below the series of coking-chambers and heating-walls; and gas and air connections arranged to supply gas and air to continuous rows in both series of such flues fired simultaneously in each heating-wall; substantially as specified.

11. In a coking retort oven, in combination: a series of elongated coking-chambers with intermediate heating-walls constituted of two series of vertical combustion-flues, the respective series being contiguous to the coking-chambers on either side of each such wall, the flues in each series being narrow transversely of the wall and presenting wide heating-faces toward the contiguous coking-chamber, and being disposed in continuous rows in respect of the provision for simultaneously firing them; combustion-products conduit means above and communicating with said flues; and gas and air connections arranged to supply gas and air to continuous rows in both series of such flues fired simultaneously in each heating-wall; substantially as specified.

12. In a coking retort oven, in combination: a series of elongated coking-chambers with intermediate heating-walls constituted of two series of vertical combustion-flues, the respective series being contiguous to the coking-chambers on either side of each such wall, the flues in each series being narrow transversely of the wall and presenting wide heating-faces toward the contiguous coking-chamber, and being disposed in continuous rows in respect of the provision for simultaneously firing them; cross-regenerators below the series of coking-chambers and heating-walls; and gas and air connections arranged to supply gas and air to continuous rows in both series of such flues fired simultaneously in each heating-wall; substantially as specified.

13. In a coking retort oven, in combination; a series of elongated coking-chambers with intermediate heating-walls constituted of two series of vertical combustion-flues, the respective series being contiguous to the coking-chambers on either side of each such wall, and being disposed in continuous rows in respect of the provision for simultaneously firing them; and cross-generators below the series of coking-chambers and heating-walls and arranged to supply preheated air to continuous rows in both series of such flues fired simultaneously in each heating-wall; substantially as specified.

14. In a coking retort oven, in combination: a series of elongated coking-chambers with intermediate heating-walls constituted of two series of combustion-flues, the respective series being contiguous to the coking-chambers on either side of each such wall, and grouped in the respective halves of the length of such wall; and cross-regenerators disposed end to end in pairs below the series of coking-chambers and heating-walls and individually arranged to supply preheated air to an adjacent series of flues in half the length of an adjacent heating-wall; substantially as specified.

15. In a coking retort oven having separately controlled gas-supplies for each of its groups of flues, and reversing means for alternately operating said separate gas-supplies and correspondingly reversing the communication of the respective regenerators with the air-supply and the stack-gas outflow, in combination: a series of coking-chambers with intermediate heating-walls constituted of two series of combustion-flues, the respective series being contiguous to the coking-chambers on either side of each such wall, the flues in each series being narrow transversely of the wall and presenting wide heating-faces toward the contiguous coking-chamber, and grouped in the respective halves of the length of such wall; conduit means for conducting the combustion products from one to the other of the groups of flues occupying the respective halves of the length of each heating-wall; regenerators separately communicating with said groups of flues; and separate gas-ducts for each of said groups of flues; substantially as specified.

16. In a coking retort oven having separately controlled gas-supplies for each of its groups of flues, and reversing means for alternately operating said separate gas-supplies and correspondingly reversing the communication of the respective regenerators with the air-supply and the stack-gas outflow, in combination: a series of elongated coking-chambers with intermediate heating-walls constituted of two series of combustion-flues, the respective series being contiguous to the coking-chambers on either side of each such wall, the flues in each series being narrow transversely of the wall and presenting wide heating-faces toward the contiguous coking-chamber, and grouped in the respective halves of the length of such wall; cross-regenerators below the series of coking-chambers and heating-walls and separately communicating with the flues grouped in the respective halves of the length of each heating-wall; and separate gas-ducts for each of said groups of flues; substantially as specified.

17. In a coking retort oven having separately controlled gas-supplies for each of its groups of flues, and reversing means for alternately operating said separate gas-supplies and correspondingly reversing the communication of the respective regenerators with the air-supply and the stack-gas outflow, in combination; a series of elongated coking-chambers with intermediate heating-walls constituted of two series of combustion-flues, the respective series being contiguous to the coking-chambers on either side of each such wall, and grouped in the respective halves of the length of such wall; and cross-regenerators below the series of coking-chambers and heating-walls and separately communicating with the flues grouped in the respective halves of the length of each heating-wall; and separate gas-ducts for each of said groups of flues; substantially as specified.

18. In a coking retort oven, in combination: a series of elongated coking-chambers with intermediate heating-walls constituted of two series of combustion-flues, the series laterally abutting each other and being respectively contiguous to the coking-chambers on either side of each such wall, and being disposed in mutually contiguous relation in respect of the provision for simultaneously firing them; and cross-regenerators below the series of coking-chambers and heating-walls and arranged to supply preheated air to a multiplicity of simultaneously fired contiguous flues of both series in each heating-wall; substantially as specified.

19. In a coking retort oven having a series of coking-chambers with intermediate heating-walls constituted of series of combustion-flues, gas-conduits having inlets into said flues, for projecting streams of gas substantially perpendicularly from the inlet ends of said flues, and regenerators having ducts terminating in ports opening into said flues and so disposed as to project regeneratively preheated air into said flues in streams substantially paralleling the said gas-streams: removable plugs for reducing the orifices of said air-ports, the said plugs being adapted to reduce the cross-section of the issuing air-stream without deflecting it from its substantial parallelism with the gas-stream; substantially as specified.

20. In a coking retort oven having a series of coking-chambers with intermediate heating-walls constituted of series of combustion-flues, gas-conduits having inlets into said flues, for projecting streams of gas substantially perpendicularly from the inlet ends of said flues, and regenerators having ducts terminating in ports opening into said flues and so disposed as to project regeneratively preheated air into said flues in streams substantially paralleling the said gas-streams: removable plugs for reducing the orifices of said air-ports, the said plugs being adapted to enter deeply into said ports and form with the opposing walls thereof a straight channel whereby the cross-section of the issuing air-stream is reduced without deflecting it from its substantial parallelism with the gas-stream; substantially as specified.

21. In a coking retort oven having a series of coking-chambers with intermediate heating-walls constituted of series of combustion-flues, gas-conduits having inlets into said flues, for projecting streams of gas substantially perpendicularly from the inlet ends of said flues, and regenerators having ducts terminating in ports opening into said flues and so disposed as to project regeneratively preheated air into said flues in streams substantially paralleling the said gas-streams: removable plugs for reducing the orifices of said air-ports, the said plugs being adapted to enter deeply into said ports and form with the opposing walls thereof a straight channel whereby the cross-section of the issuing air-stream is reduced without deflecting it from its substantial parallelism with the gas-stream, and the bases of said plugs being so shaped as to direct the air-flow into said channels without deflecting the outflow from its substantial parallelism with the walls of said channels; substantially as specified.

22. In a coking retort oven having a series of coking-chambers with intermediate heating-walls constituted of series of combustion-flues, gas-conduits having inlets into said flues, for projecting streams of gas substantially perpendicularly from the inlet ends of said flues, and regenerators having ducts terminating in ports opening into said flues and so disposed as to project regeneratively preheated air into said flues in streams substantially paralleling the said gas-streams: removable plugs for reducing the orifices of said air-ports, the said plugs being adapted to enter deeply into said ports and form with the opposing walls thereof a straight channel whereby the cross-section of the issuing air-stream is reduced without deflecting it from its substantial parallelism with the gas-stream, and the tops of said plugs being provided with flanging adapted to support them on the edges of said air-ports; substantially as specified.

23. In a coking retort oven having a series of coking-chambers with intermediate heating-walls constituted of series of combustion-flues, gas-conduits having inlets into said flues, for projecting streams of gas substantially perpendicularly from the inlet ends of said flues, and regenerators having ducts terminating in ports opening into said flues and so disposed as to project regeneratively preheated air into said flues in streams substantially paralleling the said gas-streams: removable plugs for reducing the orifices of said air-ports, the said plugs being adapted to enter deeply into said ports and form with the opposing walls thereof a straight channel whereby the cross-section of the issuing air-stream is reduced without deflecting it from its substantial parallelism with the gas-stream, and the tops of said plugs being provided with flanging adapted to support them on the edges of said air-ports, the said edges of the air-ports being recessed to receive and retain the said flanging of the plugs; substantially as specified.

24. In a coking retort oven, in combination: a series of coking-chambers with intermediate heating-walls constituted of series of combustion-flues; an air-regenerator and a gas-regenerator each having ducts communicating with each of said flues; other gas-conduits to lead an alternative gas-supply to said flues independently of said gas-regenerator; means for employing said alternative gas-supply and converting said gas-regenerator into a supplemental air-regenerator; and removable plugs for reducing the orifices of the aforesaid regenerator-ducts into said flues when such alternative gas-supply and supplemental air-regenerator are employed, the said plugs being adapted to reduce the cross-section of the inflowing air-streams without deflecting them from substantial parallelism with the gas-streams issuing into the flues from said alternative gas-supply; substantially as specified.

25. In a coking retort oven, in combination: a series of elongated coking-chambers with intermediate heating-walls constituted of series of combustion-flues; cross-regenerators for preheating air and other cross-regenerators for preheating gas, both positioned under the series of coking-chambers and heating-walls and having ducts communicating with each of said flues; other gas-conduits to lead an alternative gas-supply to said flues independently of said gas-regenerators; means for employing said alternative gas-supply and converting said gas-regenerators into supplemental air-regenerators; and removable plugs for reducing the orifices of the aforesaid regenerator-ducts into said flues when such alternative gas-supply and supplemental air-regenerator are employed, the said plugs being adapted to reduce the cross-section of the inflowing air-streams without deflecting them from substantial parallelism with the gas-streams issuing into the flues from said alternative gas-supply; substantially as specified.

26. In a coking retort oven, the combination of a coking chamber having a doorway, a door adapted to be inserted therein, and a lintel for engaging the upper edge of said door and including a brick or lintel unit constructed of refractory material reinforced internally with metal tie-rods, inserted from end to end of the lintel and adapted to sustain said material in place against the shock and strain of the lifting and replacement of the removable oven-door, substantially as specified.

27. In a coking retort oven, in combination: a series of coking-chambers with intermediate heating-walls, said walls being constituted of two series of substantially triangular combustion-flues alternately facing oppositely toward the coking-chambers contiguous to either side of each such walls; and a single gas-conduit provided with a row of outlets arranged to deliver gas upwardly into a succession of the flues of both series; substantially as specified.

28. In a coking retort oven having separately controlled gas-supplies for each of its groups of flues, and reversing means for alternately operating said separate gas-supplies and correspondingly reversing the communication of the respective regenerators with the air-supply and the stack-gas outflow, in combination: a series of coking chambers with intermediate heating walls, said walls being constituted of two series of substantially triangular combustion-flues alternately facing oppositely to the coking chambers contiguous to either of said walls, and grouped in the respective halves of the length of such wall; a pair of combustion products ducts respectively communicating with each series of flues in the heating wall between each pair of coking chambers; regenerators separately communicating with the flues grouped in the respective halves of each heating wall, and separate gas-ducts for each said group of flues; substantially as specified.

29. In a coking retort oven, in combination: a series of coking-chambers with intermediate heating-walls, said walls being constituted of two series of substantially triangular combustion-flues, the series laterally abutting each other and being respectively contiguous to the coking-chambers on either side of each such wall, each series of flues having above it combustion-products conduit means separate from such means above the other series; and regenerators communicating with the flues; substantially as specified.

In testimony whereof I have hereunto set my hand in the presence of two subscribing witnesses.

JOSEPH BECKER.

Witnesses:
G. G. TRILL,
Jos. D. VORAK.

It is hereby certified that in Letters Patent No. 1,312,301, granted August 5, 1919, upon the application of Joseph Becker, of Pittsburgh, Pennsylvania, for an improvement in "Coking Retort-Ovens," an error appears in the printed specification requiring correction as follows: Page 6, line 14, claim 13, for the compound word "cross-generators" read *cross-regenerators;* and that the said Letters Patent should be read with this correction therein that the same may conform to the record of the case in the Patent Office.

Signed and sealed this 30th day of September, A. D., 1919.

[SEAL.]

M. H. COULSTON,

*Acting Commissioner of Patents.*

Cl. 202—9.